United States Patent [19]

Kitamura et al.

[11] 4,104,679
[45] Aug. 1, 1978

[54] COLOR ERROR SUPPRESSION APPARATUS AND METHOD

[75] Inventors: Yoshinori Kitamura, Katano; Ryuhei Nakabe, Hirakata, both of Japan

[73] Assignee: Matsushita Electric Industrial Co., Ltd., Kadoma, Japan

[21] Appl. No.: 728,884

[22] Filed: Oct. 1, 1976

[30] Foreign Application Priority Data

| Mar. 18, 1974 | [JP] Japan | 49-31204 |
| Mar. 19, 1974 | [JP] Japan | 49-32121 |
| Mar. 19, 1974 | [JP] Japan | 49-32122 |
| Sep. 26, 1974 | [JP] Japan | 49-11036 |

Related U.S. Application Data

[63] Continuation of Ser. No. 599,651, Mar. 18, 1975, abandoned.

[51] Int. Cl.$^2$ ............................................. H04N 9/07
[52] U.S. Cl. .............................................. 358/44; 358/21
[58] Field of Search .................... 358/43, 44, 47, 21

[56] References Cited

U.S. PATENT DOCUMENTS

| 3,688,022 | 8/1972 | Marshall | 358/44 |
| 3,699,241 | 10/1972 | Larsen | 358/43 |

*Primary Examiner*—Richard Murray
*Attorney, Agent, or Firm*—Wenderoth, Lind & Ponack

[57] ABSTRACT

An apparatus and method for suppressing color error components generated in a color television camera of the type in which color component signals representing first and second colors of a color image are recovered by utilizing a difference of phase relationship of modulated color signals, one of which changes in successive horizontal scan lines. In this apparatus and method, a color correction signal which indicates positions of color errors and provides preferred color error correction is produced from an unmodulated component of an output from a pick up tube by operating upon such component. The wave shape of at least one of a luminance signal which is derived from the unmodulated component of the output from the pick up tube and used to generate color signals and the color component signals recovered by operating upon a modulated component of the output is adjusted, preferably in accordance with the color correction signal, so that the color error components which are generated when the color component signals are recovered and which are included in the color component signals are suppressed at least in the color signals which are produced from the luminance signal and the color component signals during generation of a color video signal.

23 Claims, 38 Drawing Figures

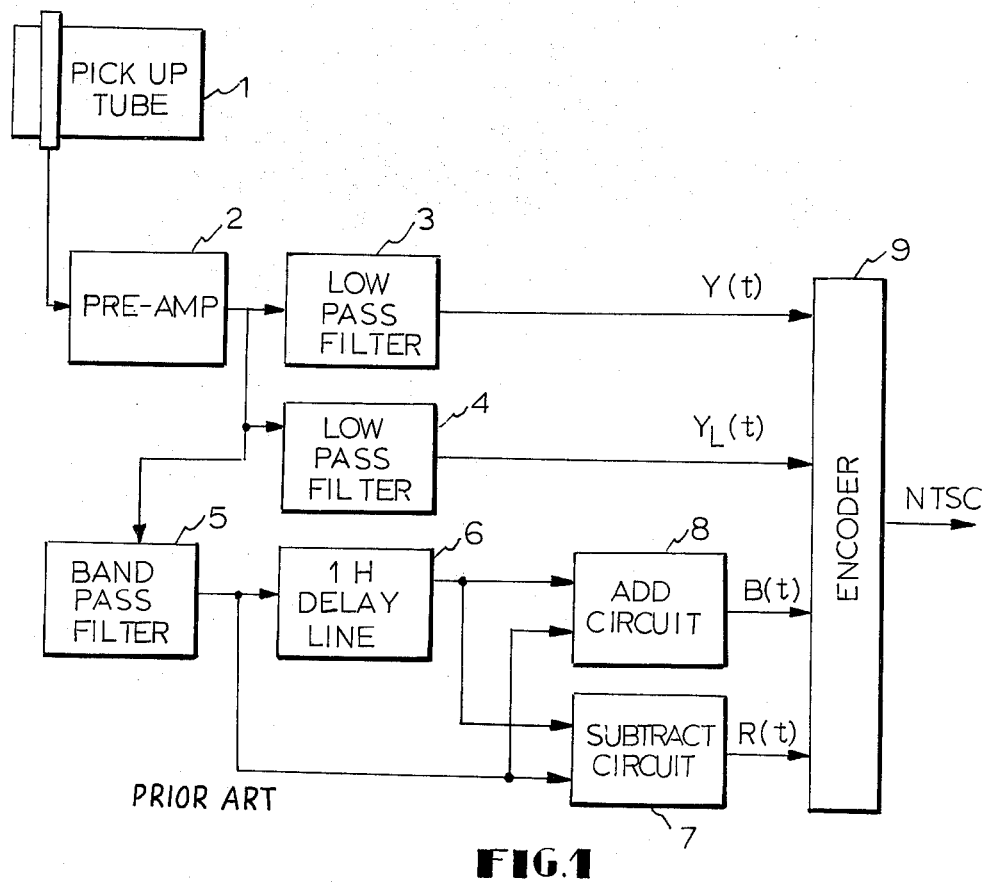
FIG.1 PRIOR ART
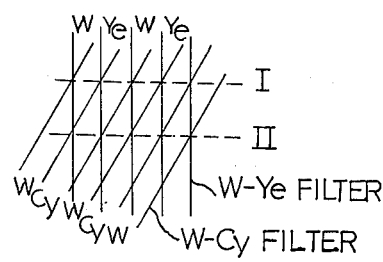
FIG.2
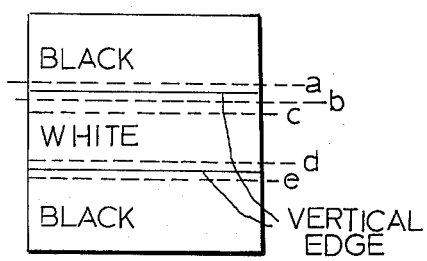
FIG.3
FIG.4a  $Y_L(t)$
FIG.4b  $R(t)$
FIG.4c  $B(t)$
FIG.4d  $R(t)$
FIG.4e  $B(t)$

COLOR ERROR SUPPRESSION APPARATUS AND METHOD

This is a continuation of application Ser. No. 599,651, filed Mar. 18, 1975, now abandoned.

BACKGROUND OF THE INVENTION

This invention relates to a color error suppression apparatus and method for a color television camera in which color component signals representing first and second colors of a color image are reproduced by utilizing a difference of modulation phase relationships of the color component signals, one of which changes in successive scan lines.

An apparatus of the type employing a single pick up tube for producing a color video signal by the method of processing successive line signals produced by line scannings is shown, for example, in U.S. Pat. No. 3647943 or Japanese Published Pat. No. 45-8699. In those apparatuses a composite image is formed on a photoconductive surface, which has a first color such as blue spatially modulated in a first line pattern by one striped color filter, and a second color such as red spatially modulated in a second line pattern having a different angular relationship from the first line pattern by another striped filter. The signals representing the composite image are produced by scanning such an image. A modulated component of the signals is then processed to recover first and second color component signals in accordance with the first and second phase relationships in the successive line signals, respectively. The signals representing the luminance of the color image are produced from an unmodulated component of the composite signal through a lowpass filter and the third color signal such as a green signal, can be produced by operating upon the first and second color signals and the luminance signal.

In such an apparatus, when the video pattern of the object has relationships in the successive lines of scan such as in a vertical color bar pattern, the reproduction of each color may be achieved faithfully. On the contrary when the video pattern has no relationship or even partial relationship in the successive lines such as in horizontal color bar pattern including vertical edge portions therein, color errors take place at the edge portions in the reproduced image on a picture screen of a color television reproducing apparatus.

FIG. 1 is a block diagram of a color television camera which makes use of the Japanese Published Pat. No. 45-8699, wherein the pick up tube 1 comprises the striped color filters as shown schematically in FIG. 2. One of them, which is disposed perpendicular to the direction of horizontal line scanning contains a plurality of striped filter element pairs, W-elements which are transparent, and Ye-elements which have characteristics causing them to pass red and green light. The other striped color filter, which is disposed so as to have the elements in a different angular position from the element of the W - Ye striped filter relative to the direction of scanning, contains plurality of striped color filter element pairs, W - elements, and Cy - elements which have characteristics causing them to pass blue and green light. This W - Cy striped filter is placed over the W - Ye striped filter in such a position that the modulated red signals produced by the line scans have a phase relationship substantially 180° out of phase in successive horizontal scan lines I, II, etc.

The output signal from the pick up tube 1 is amplified by a pre-amplifier 2 and supplied to a low-pass filter 3 to produce a luminance signal Y(t), and to another low-pass filter 4 to produce a luminance signal $Y\angle(t)$ which is used to produce color difference signals, and is also supplied to a band-pass filter 5. The blue component signal B(t) is obtained from an adding circuit 8 including an amplifier and a demodulator by adding the output of the band-pass filter 5 and that of the 1 H-delay line 6. On the other hand, the red component signal R(t) is obtained from a subtractive circuit 7 including an amplifier and a demodulator by subtracting the output of the 1H-delay line 6 from that of the band-pass filter 5. In the encoder 9, the color difference signals B-Y and R-Y are produced from the color component signals R(t) and B(t) and the luminance signals $Y\angle(t)$. They are modulated by balanced modulators then mixed with the luminance signal Y(t) to generate the NTSC standard signal.

In this color television camera, the signal produced on the scan line I as shown in FIG. 2 is expressed by the following equation:

$$S(t) = G + \frac{R}{2} + \frac{B}{2} + (m_B \cdot B + m_R \cdot R) \cdot \sin \omega t,$$

and the signal produced on the next scan line II is expressed as:

$$S(t) = G + \frac{R}{2} + \frac{B}{2} + (m_B \cdot B - m_R \cdot R) \cdot \sin \omega t,$$

where, G, R and B represent green, red and blue components, respectively, $m_b \cdot B$ and $m_r \cdot R$ represent modulated blue and red components, and $\omega = 2\pi f$, $f$ is the spatial frequency in cycles of modulation.

When an image pattern, which has the sequence black-white-black in the vertical direction and including two vertically edges as shown in FIG. 3 is scanned, the output signals $Sa(t)$, $Sb(t)$, $Sc(t)$, $Sd(t)$, and $Se(t)$ from the pick up tube 1 are shown by the following equations in the scan lines a,b,c,d and e on the assumption that the scan lines correspond to the scan lines I, II, I, II, I in FIG. 2, respectively:

$$Sa(t) = 0 \quad (1)$$

$$Sb(t) = G + \frac{R}{2} + \frac{B}{2} + (m_B \cdot B + m_R \cdot R) \cdot \sin \omega t \quad (2)$$

$$Sc(t) = G + \frac{R}{2} + \frac{B}{2} + (m_B \cdot B - m_R \cdot R) \cdot \sin \omega t \quad (3)$$

$$Sd(t) = G + \frac{R}{2} + \frac{B}{2} + (m_B \cdot B + m_R \cdot R) \cdot \sin \omega t \quad (4)$$

$$Se(t) = 0$$

In this case, the signals $Y\angle(t)$, R(t) and B(t) reproduced from the low-pass filter 4, the adding circuit 8 and the subtractive circuit 7 in FIG. 1 are shown in FIG. 4a FIG. 4b and FIG. 6, respectively for the condition that $m_{r \cdot R} = m_b \cdot B$. A color error that is magenta occurs at the edge portion where the image pattern changes from white to black.

On the other hand if each scan line a, b, c, d, e corresponds to the scan lines II, I, II, I, II in FIG. 2, respectively, the output signals of the pick up tube 1 are shown in following equations:

$$Sa(t) = 0 \quad (6)$$

-continued $$Sb(t) = G + \frac{R}{2} + \frac{B}{2} + (m_B \cdot B - m_R \cdot R) \cdot \sin \omega t \qquad (7)$$

$$Sc(t) = G + \frac{R}{2} + \frac{B}{2} + (m_B \cdot B + m_R \cdot R) \cdot \sin \omega t \qquad (8)$$

$$Sd(t) = G + \frac{R}{2} + \frac{B}{2} + (m_B \cdot B - m_R \cdot R) \cdot \sin \omega t \qquad (9)$$

$$Se(t) = 0 \qquad (10)$$

In this case, the signals $Y\angle(t)$, $R(t)$ and $B(t)$ are shown in FIG. 4, FIG. 4d and FIG. 4e, respectively, for the condition $m_{rR} = _{mb} \cdot B$. A color error, that is green occurs at the edge portion where the image pattern changes from black to white.

The above analysis has been simplified to the case in which the horizontal line scanning is carried out on the scan lines I or II in FIG. 2 where the color error becomes extreme. However, the line scanning may also be carried out on other lines different from I and II, so the reproduced red signal $R(t)$ can be represented as the average of $R(t)$ in FIG. 4b and FIG. 4d as shown in FIG. 5b and the reproduced blue signal $B(t)$ can be represented as the average of $B(t)$ in FIG. 4(C) and FIG. 4(e) as shown in FIG. 5(c).

On the other hand, when the modulated components are not equal ($m_R \cdot R$ $m_b \cdot B$) which can be expressed as $m_R \cdot R = n \cdot m_b \cdot B$ (the value of n depends on the characteristics of the pick up tube and the color filter, and on the color temperature of the image) the gain of the adding circuit 8 must be n times that of the subtractive circuit 7 so that the amplitude of the signals $R(t)$ and $B(t)$ will be equal at the input terminals of the encoder 9. Under these conditions the red and blue component signals $R(t)$ and $B(t)$ can be represented by the following equations, respectively, in the first aforementioned case. The signals produced by the scan on line b in FIG. 3 which are obtained from the equations (1) and (2): are $$R(t) = m \cdot B + m_R \cdot R = (1 + n) m_B \cdot B \qquad (11)$$

$$B(t) = n \cdot (m_B \cdot B + m_R \cdot R) = n \cdot (1 + n) \cdot m_B \cdot B \qquad (12)$$

The signals produced by the scan of the next line are c, which are obtained from the equations (2) and (3):

$$R(t) = 2 \cdot m_R \cdot R = 2 \cdot n \cdot m \cdot B \qquad (13)$$

$$B(t) = 2 \cdot n \cdot m_B \cdot B \qquad (14)$$

The signals reproduced by the scan line e are same as the equations (11) and (12). If $n = 3$, the signals $Y\angle(t)$, $R(t)$ and $B(t)$ are shown in FIG. 6a, FIG. 6b and FIG. 6c, respectively. Therefore, color errors which are bluish occur at both edge portions where the image pattern change from black to white and from white to black in this first case.

In the second aforementioned case when scan lines a, b, c, d, e in FIG. 3 corresponds to the scan lines II, I, II, I, II in FIG. 2, respectively, the red and blue component signals $R(t)$ and $B(t)$ can be represented by the following equations.
The signals produced by the scan 4 line b in FIG. 3 which are obtained from the equations (6) and (7) are:

$$R(t) = m_r \cdot R - m_B \cdot B = (n-1) m_B \cdot B \qquad (15)$$

$$B(t) = n \cdot (m_R \cdot R - m_b \cdot B) = n \cdot (n - 1) \cdot m_B \cdot B \qquad (16)$$

The signals produced by the scan of the next scan line c which are obtained from the equations (7) and (8) are:

$$R(t) = 2 \ m_R \cdot R = 2 \cdot n \cdot m_B \cdot B \qquad (17)$$
$$B(t) = 2 \cdot n \cdot m_B \cdot B \qquad (18)$$

The signals produced by the scan 4 line e are the same as the equations (15) and (16). On condition $n = 3$, the signals $Y\angle(t)$, $R(t)$ and $B(t)$ are shown in FIG. 7A, FIG. 7b and FIG. 7c, respectively The color errors also occur in the case at both edges.

As the line scanning may be carried out on the other lines in general, the color component signal $R(t)$ obtained in practice may be represented as the average of $R(t)$ in FIG. 6b and FIG. 7b as shown in FIG. 8b, and $B(t)$ may be represented as the average of $B(t)$ in FIG. 6(c) and FIG. 7(c) as shown in FIG. 8(c).

In any case, these color errors take place at the vertically spaced edge portions where the video pattern has no relationship in successive lines so long as the color error suppression method such as that of this invention is not in use.

SUMMARY OF THE INVENTION

An object of this invention, therefore, is to provide an apparatus for suppressing such color errors in the color television camera. Another object of this invention is to provide a method for suppressing color error signals generated in the type of television camera that produces a color video signal by operating upon successive line signals.

According to this invention, vertically spaced edges are detected by processing the unmodulated signal such as the luminance signal, and the detection signal is utilized to control the wave shape of the luminance signal used to reproduce color, the wave shapes of the color component signals, or both signals to generate the error suppressed color video signal.

In one embodiment of this invention, the color correction signal produced from the detection signal is added to the luminance signal used to reproduce color signals to generate a corrected luminance signal, so that the color error components in the color signals which are produced from the corrected luminance signal and color component signals and used to generate the color video signal are minimized.

In another embodiment, the color correction signal is utilized to decrease the color error components in the demodulated color component signals to produce corrected color component signals, so that the color signals will include suppressed color error components.

The above and other objects, features and advantages will become readily apparent from the following description some practical embodiments of the invention.

BRIEF DESCRIPTION OF THE DRAWINGS

FIG. 1 is a block diagram showing the constitution of one example of a color television camera to which this invention is effectively applicable;

FIG. 2 is a schematic diagram showing the color filter used in the pick up tube of FIG. 1;

FIG. 3 is a schematic diagram showing one example of video patterns;

FIGS. 4a –4b, 5a–5c, 6a–6c, 7a–7b and 8a–8c are diagrams of the reproduced color component signals and the luminance signal in the television camera shown in FIG. 1 when the video pattern shown in FIG. 3 is scanned;

FIG. 13 is a circuit diagram showing the circuitry for producing the weighted difference signal shown in FIG. 12a;

DESCRIPTION OF THE PREFERRED EMBODIMENTS

Figure 9:
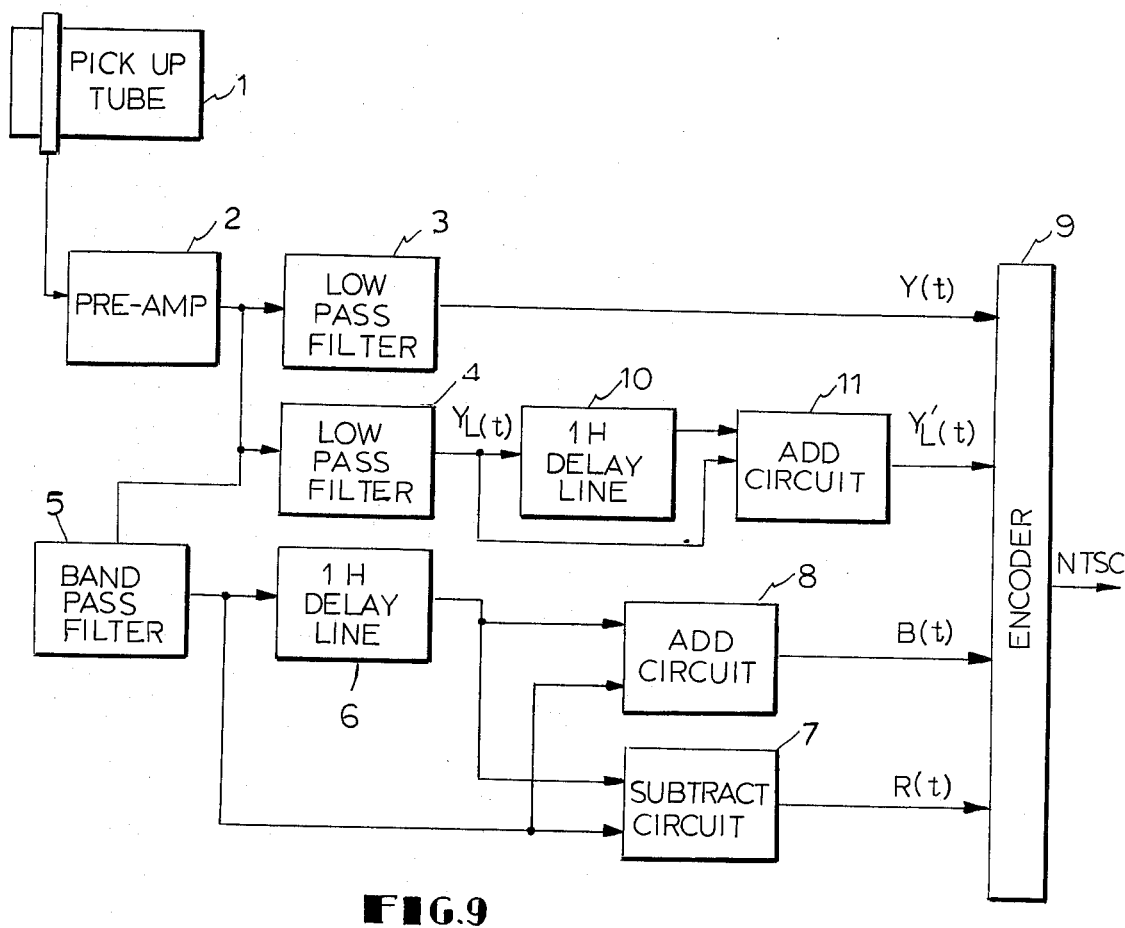
FIG. 9 is a block diagram showing the constitution of the first embodiment of the color error suppression apparatus according to this invention.

In the first embodiment of the invention, shown in FIG. 9, the luminance signal $Y_L(t)$, which is used to reproduce the color signals such as color difference signals and the bandwidth of which is limited by the low-pass filter 4 so as to be substantially equal to that of the reproduced color component signals, is derived from the unmodulated component of the output from the pick up tube 1 and is supplied to a 1H-delay line 10 which delays the signal $Y_L(t)$ by one horizontal period and also provided directly to one of the input terminals of a adding circuit 11, to the other terminal to which the output of the 1H-delay line 10 is supplied. The output of the 1H-delay line 10 and the luminance signal $Y_L(t)$ are added to each other in the adding circuit 11 to produce a corrected luminance signal $Y_L'(t)$ shown in FIG. 10, when the video pattern of FIG. 3 is scanned. On the other hand, the color component signals $B(t)$ and $R(t)$ are produced in the adding circuit 8 and subtractive circuit 7 in the same way as in the prior art circuit shown in FIG. 1. That is to say, the red and blue signals which are modulated by the color striped filter as shown in FIG. 2 at the same frequency, such as 4 MHz, but with different phase relationships in the successive scan lines are derived through the band-pass filter 5. The output signal of the band-pass filter 5 is supplied to one of the terminals of each of the adding circuit 8 and subtractive circuit 7, each of which includes a detection circuit and an amplifier, through the 1H-delay line 6, and the output of the band-pass filter 5 is also supplied to the remaining terminal of each of the aforesaid circuits 7 and 8 directly. These two inputs are then processed so as to produce the color component signals $R(t)$ and $B(t)$.

Figure 5A:
Figure 5B:
Figure 5C:
Figure 6A:
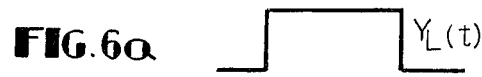
Figure 6B:
Figure 6C:
Figure 7A:
Figure 7B:
Figure 7C:
Figure 10:
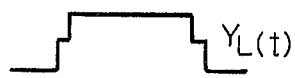
FIG. 10 is a diagram showing the corrected luminance signal generated in the apparatus of FIG. 9 when the video pattern shown in FIG. 3 is scanned.

If the amplitude of the modulated red and blue signals are as equal ($m_r \cdot R = m_B \cdot b$), the red and blue component signals $R(t)$ and $B(t)$ are shown in FIG. 5(B) and FIG. 5c, respectively, as described above, which are similar to the corrected luminance signal $Y_L'(t)$ shown in FIG. 10. Since the color difference signals are produced by subtracting the corrected luminance signal from each color component signal in the encoder 9, the resemblance between the wave shape of corrected luminance signal and that of the color component signals results in the suppression of color errors in the color signals. This simple color error reduction method is obviously effective for any other video patterns different from the black-white-black pattern shown in FIG. 3.

A corrected luminance signal $Y_L'(t)$ can also be obtained by circuitry similar to that shown in FIG. 13 and described hereinafter, which consists of the 1H-delay line to which the output of the low-pass filter 4 is supplied, the subtractive circuit which subtracts the delayed luminance signal from the original luminance signal $Y_L(t)$ to produce the difference signal representing the positions of the edge portions, and the adding circuit which is connected to both the low-pass filter 4 and the subtractive circuit for adding the signals therefrom to produce the corrected luminance signal. Such circuitry is the equivalent of that of the 1H-delay line 10 and adding circuit 11 in FIG. 9.

Figure 8A:
Figure 8B:
Figure 8C:

On the contrary, if the amplitudes of the modulated red and blue signals are not equal, but rather can be expressed as $m_R \cdot R = n \cdot m_B \cdot B$ (suppose $n = 3$), the color component signals $R(t)$ and $B(t)$ are as shown in FIG. 8b and FIG. 8c, respectively, as described above when the video pattern of FIG. 3 is scanned. Since the wave shapes are different in this case, the color error reduction is achieved by generating the corrected luminance signal $Y_L'(t)$ shown in FIG. 11, which is the weighted average of the red and blue component signals. In practice, color errors of red are more conspicuous than those of blue on the picture screen of the color reproducing system and therefore the weight for the red component signal $R(t)$ should be greater than that for the blue component signal $B(t)$.

Figure 12A:
FIG. 12(a) is a diagram showing the weighted difference signal which is required to suppress the color error component and FIG. 12(b) is a diagram showing the uncorrected luminance signal.
Figure 11:
FIG. 11 is a diagram showing the corrected luminance signal which is required to suppress the color error components for the condition that the gains of the modulated color component signals are not equal.
Figure 12B:
Figure 13:
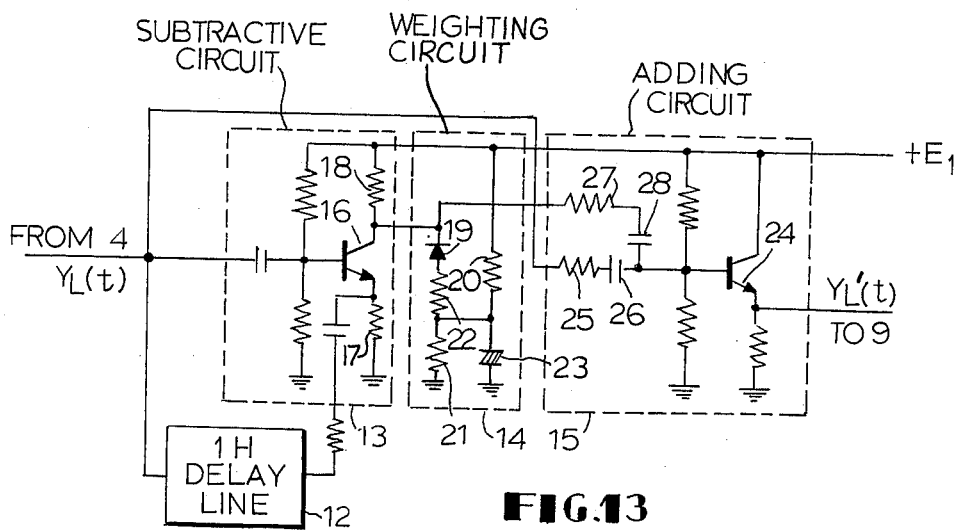

The circuitry of FIG. 13 is employed in order to generate the corrected luminance signal $Y_L'(t)$ shown in FIG. 11, and consists of a 1H-delay line 12, a subtractive circuit 13, a weighting circuit 14 and an adding circuit 15. In this circuitry, the luminance signal $Y_L(t)$ derived from the unmodulated component of the output signal from the pick up tube 1 through the low-pass filter 4 is supplied to the base electrode of a transistor 16, to the emitter electrode of which the 1H-delayed luminance signal is supplied through the 1H-delay line 12, so that the difference signal, that is the color error detection signal, is derived from the collector electrode of the transistor 16. An emitter resistance 17 can be chosen to be zero for the condition $n=3$. The difference signal is then provided to the cathode of a diode 19 in the weighting circuit 14, to the anode of which a bias voltage substantially equal to the collector voltage of the transistor 16 is supplied through resistances 20 and 21. When a negative voltage appears at the collector of the transistor 16, the diode 19 turns on to decrease such a gain of the difference signal. The impedance of a capacitor 23 is negligible for the signal, so the reduced gain is decided by the parallel resistance of a load resistance 18 of the transistor 16 and a resistance 22 connected in series with the diode 19. When the polarity of the difference signal is positive, the diode 19 remains non-conductive, therefore the gain in this case is determined by the load resistance 18. The weighted difference signal which is shown in FIG. 12a is supplied to the base electrode of a transistor 24 through a resistance 27 and a coupling capacitor 26 and added there to the luminance signal $Y_L(t)$ shown in FIG. 12 (b) which is also supplied to the base electrode through a resistance 25 and a coupling capacitor 26 to produce the corrected luminance signal $Y_L'(t)$ shown in FIG. 11 at the emitter electrode of the transistor 24. The luminance signal $Y(t)$ derived through the low-pass filter 3, the color component signals $R(t)$ and $B(t)$ shown in FIG. 8(b) and FIG. 8(c), and the corrected luminance signal $Y_L'(t)$ which is produced in the circuitry in FIG. 13 and used to reproduce the color video signal are then supplied to the encoder 9 to be processed to generate the NTSC standard signal, in which the color error components generated in subtractive circuit 7 and the adding circuit 8 are suppressed. To minimize the color errors not only for the black-white-black pattern of FIG. 3, but also for any other color video patterns, the amount by which the negative voltage of the difference signal is reduced and the mixing ratio for mixing the weighted difference signal and the luminance signal $Y_L(t)$ should be adjusted preferably by selecting suitable values for the resistances 22, 25 and 27.

Figure 14:
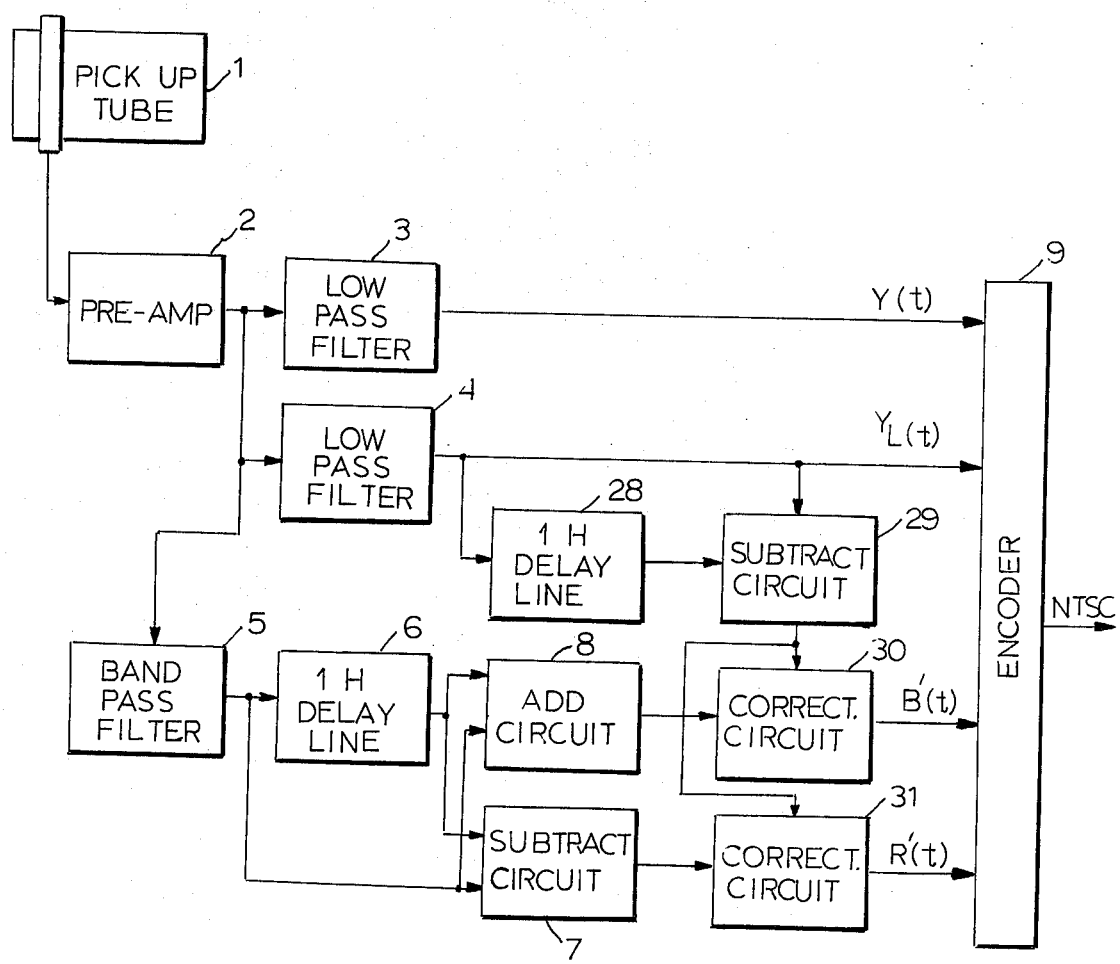
FIG. 14 is a block diagram showing a constitution of the second embodiment of the color error suppression apparatus according to this invention.

FIG. 14 shows another embodiment in which the difference signal, that is the detection signal for the color errors, is not added to nor subtracted from the luminance signal $Y_L(t)$, but rather is used to cancel or decrease the color error components in the color component signals $R(t)$ and $B(t)$, so that the color error components generated at the edge portions of the various color video patterns are minimized in the color signals produced in the encoder 9.

Figure 15A:
FIG. 15a is a diagram of the luminance signal produced in the apparatus of FIG. 14.
Figure 15B:
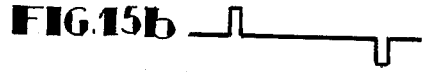
FIG. 15b is a diagram of the correction signal required to suppress the color error components.

In the block diagram of FIG. 14, the construction of the parts designated by numerals 1 ~9 is the same as that of the prior art in FIG. 1 or the above described embodiment in FIG. 9. The luminance signal $Y_L(t)$ shown in FIG. 15(a) from the low-pass filter 4 is supplied to encoder 9 to a 1H-delay line 28 and also to one of the input terminals of a subtractive circuit 29. The 1H-delayed luminance signal is provided to the other terminal of the subtractive circuit 29 and is subtracted from the non-delayed luminance signal $Y_L(t)$ to generate the difference signal such as shown in FIG. 15(b), when the line scanning is carried out on the video pattern of FIG. 3. The color component signals $R(t)$ and $B(t)$ for the same pattern detected in the subtractive circuit 7 and the adding circuit 8 are as shown in FIG. 5(b) and FIG. (C), respectively, for the condition $m_R \cdot R = m_B \cdot B$. The difference signal obtained in the subtractive circuit 29 is supplied to both correction circuits 30 and 31 which work as adding circuits for adding the difference signal to the blue and red component signals to produce the corrected color component signals $R'(t)$ and $B'(t)$, so that the color error components generated in the subtractive circuit 7 and the adding circuit 8 are decreased. For instance, when the video pattern of FIG. 3 is scanned, the color component signals shown in both indicated in FIG. 5(b) or FIG. 5(C) are corrected in the respective circuits so that the wave shapes thereof will resemble that of the luminance signal $Y_L(t)$ shown in FIG. 5(a) by adding the color correction signal thereto. The amount of correction for the blue or red component signal is preferably adjusted in each correction circuit by setting the mixing ratio suitably. The color difference signals produced from each error suppressed component signal $R'(t)$, $B'(t)$ and the luminance signal $Y_L(t)$ are then modulated by the balanced modulators and mixed with the luminance signal $Y(t)$ from the low-pass filter 3 to generate the color video signal.

Figure 16:
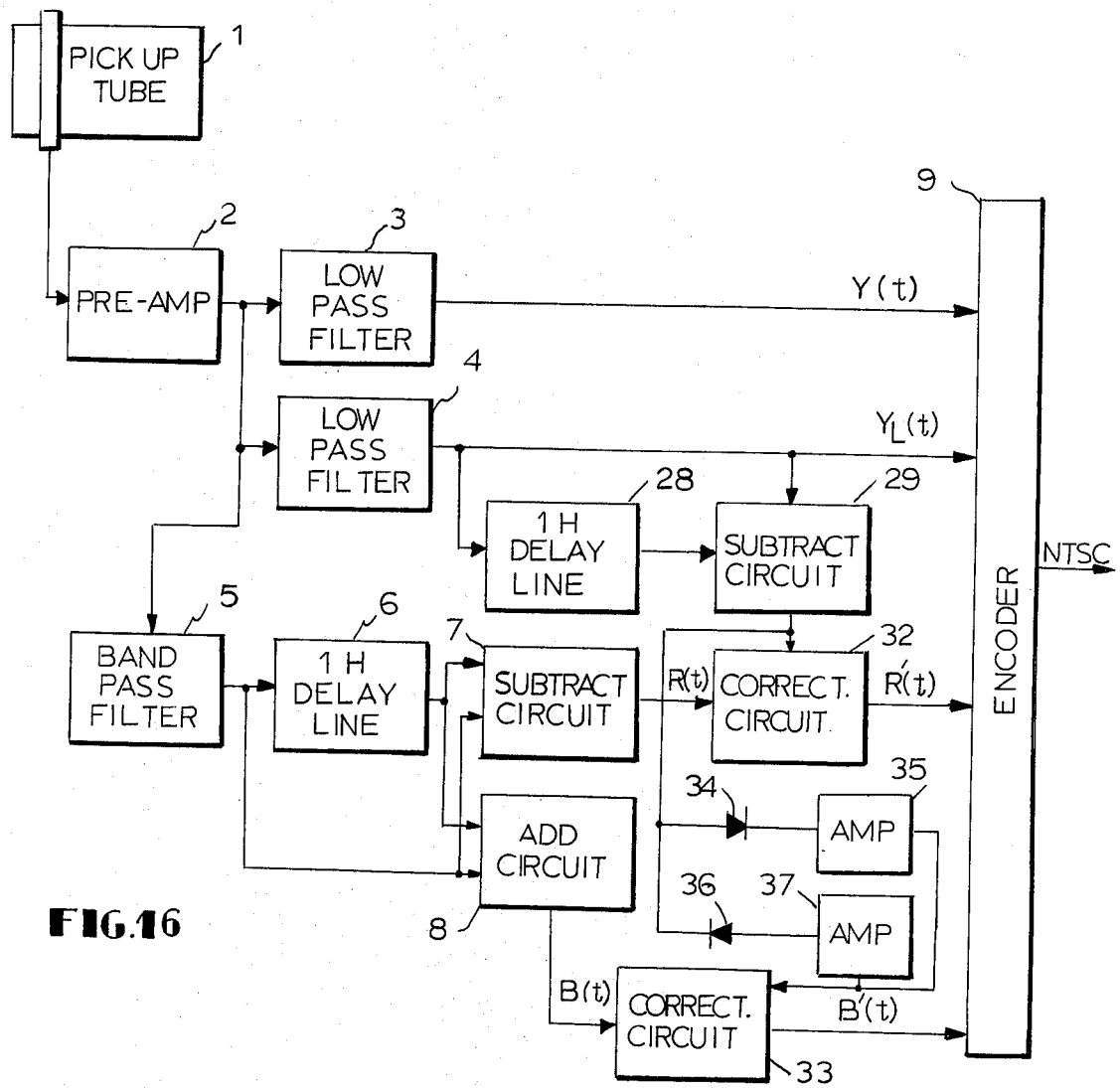
FIG. 16 is a block diagram showing the constitution of a third embodiment of the color suppression apparatus according to this invention.

If the gains of the modulated red and blue component signals are not equal, the embodiment shown in FIG. 16 can be used. In FIG. 16, the numerals 1 ~ 9 28 and 29 indicate the same elements as in FIG. 14. The difference signal obtained in the subtractive circuit 29 is supplied to a correction circuit 32, where the reproduced red component signal $R(t)$ and the color correction signal for red are added to each other to produce the corrected red component signal $R'(t)$. In the meantime, the difference signal is also supplied to another correction circuit 33 for the blue component signal, the positive component of which is supplied to the input terminal of the correction circuit 33 through a diode 34 and an amplifier 35, and the negative component of which is supplied thereto through a diode 36 and an amplifier 37, respectively.

When the video pattern of FIG. 3 is scanned, the reproduced luminance and color component signals are as shown in FIG. 8(a), FIG. 8(b) and FIG. 8(c) under the condition $m_R \cdot R = n \cdot m_B \cdot B$, as described before. In this case, the amplifier 35 operates to respond to the positive component of the difference signal such as the beginning pulse in FIG. 17(b) for generating the negative correction signal such as the beginning pulse in FIG. 17(c), and the amplifier 37 responds to the negative component of the difference signal such as the ending pulse in FIG. 17(b) for generating the negative correction signal such as the ending pulse in FIG. 17(c). These negative correction signals which are substantially equal to the correction signals as shown in FIG. 17(c) are added to the blue component signal having color error components therein in the correction circuit 33 to produce the corrected blue signal $B'(t)$ which is similar to the wave shape of the luminance signal $Y_L(t)$ shown in FIG. 17(a). The luminance signal $Y(t)$ derived through the low-pass filter 3, the luminance signal $Y_L(t)$ and corrected color component signals $R'(t)$ and $B'(t)$ are then processed in the encoder 9 to generate the NTSC signal in which the color error components are sufficiently suppressed. In general, the gain of the amplifiers 35 and 37, and the mixing ratio of the correction circuits 32 and 33 should preferably be adjusred so that the color error components are patterns minimized on the whole for any color video patterns or for such color patterns which are especially conspicuous on the picture screen.

Figure 17A:
FIG. 17a is a diagram of the luminance signal produced in the third embodiment of FIG. 16.
Figure 17B:
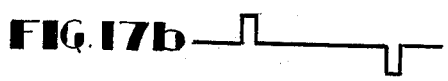
FIG. 17b is a diagram of a difference signal and FIG. 17c and FIG. 17d are color correction signals for the red and blue component signals, respectively.
Figure 17C:
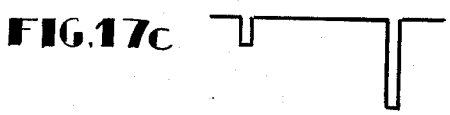
Figure 18:
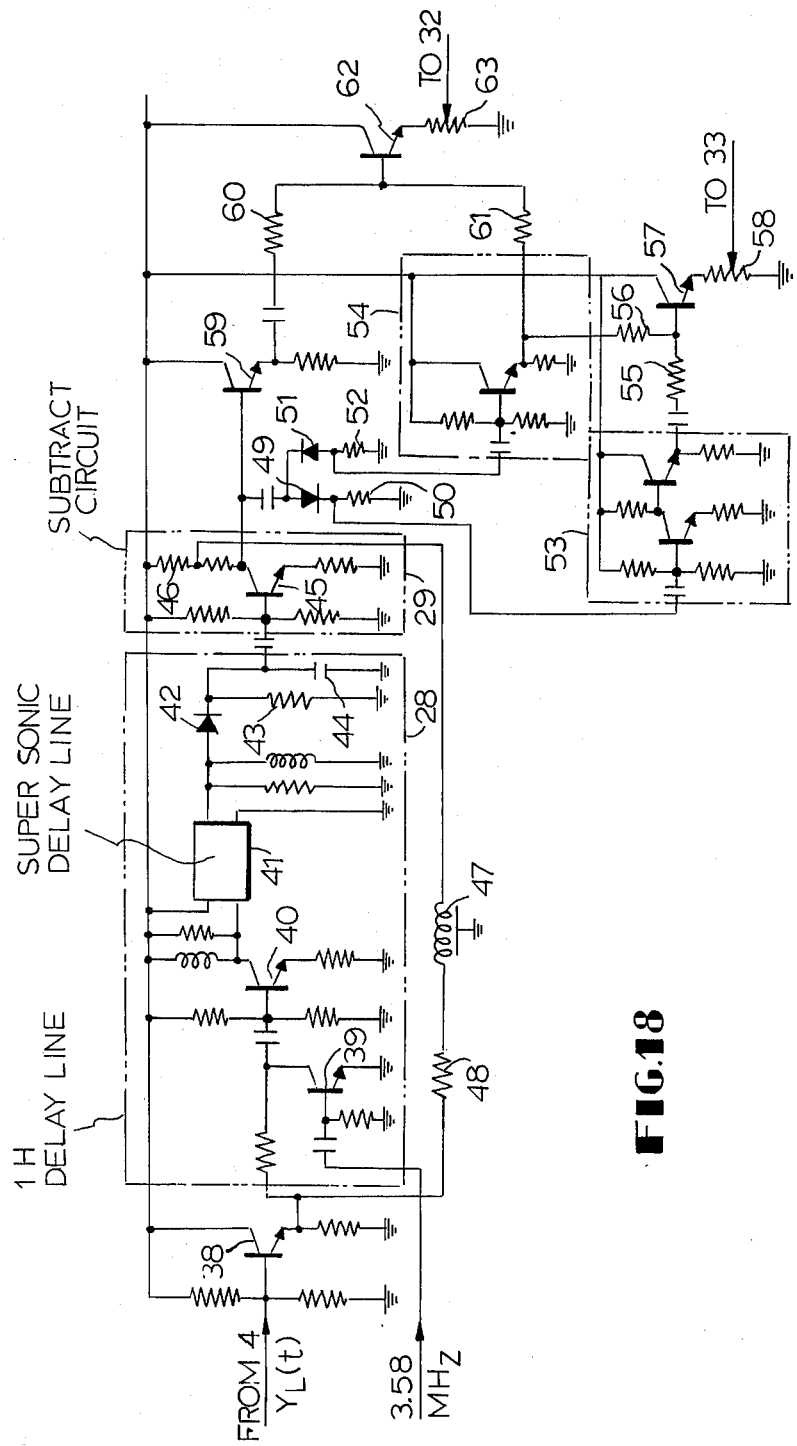
FIG. 18 is a circuit diagram showing the principal circuitries of the block diagram of FIG. 16.

FIG. 18 is the circuit diagram of the principal circuits 28, 29 and 32~37 in the block diagram of FIG. 16, in which the luminance signal $Y_L(t)$ such as shown in FIG. 17(a) from the low-pass filter 4 is supplied to a buffer amplifier 38. The luminance signal $Y_L(t)$ is modulated by a switching transistor 39 at a sampling frequency of 3.58 MHz, then amplified by a transistor 40 before being supplied to a supersonic delay line 41 which delays the amplified luminance signal by one horizontal period. The modulated and 1H-delayed signal is demodulated in the detection circuit consisting of a diode 42, a resistance 43 and a capacitor 44. The delayed luminance signal $Y_L(t)$ at the output circuit of a transistor 45 to generate the difference signal such as shown in FIG. 17(B), which represents the existence of the color errors. To adjust the phase of the original luminance signal $Y_L(t)$ to that of the delayed one, a delay line 47 is connected between the buffer amplifier 38 and the subtractive circuit 29. The impedance matching for the delay line 47 is achieved by resistances 46 and 48.

Figure 17D:
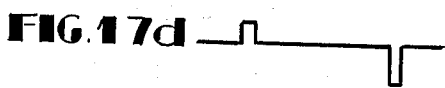

The positive component of the difference signal derived from a resistance 50 through a diode 49 is inverted by an amplifier 53, while the negative component derived from a resistance 52 through a diode 51 is buffered by an emitter-follower 54. These two components are mixed with each other through resistances 55 and 56 in a base circuit of a buffer amplifier 57. The correction signal for the blue component signal such as shown in FIG. 17d is obtained from a variable resistance 58 and supplied provided to the correction circuit 33. The difference signal from the transistor 45 is also supplied to an emitter-follower 59 and it is mixed with the negative components from the emitter-follower 54 through resistances 60 and 61 and supplied to the base of an emitter follower, so that the correction signal for the red component signal such as shown in FIG. 17(d) might be derived from a variable resistance 63 connection to the emitter-follower 62.

The wave shape of the correction signal for red is adjusted preferably by resistances 60 and 61 and its gain is adjusted by the variable resistance 63. In like manner, the wave shape and gain of the correction signal for blue are adjusted preferably by resistances 55 and 56 and the variable resistance 58, respectively.

Figure 19:
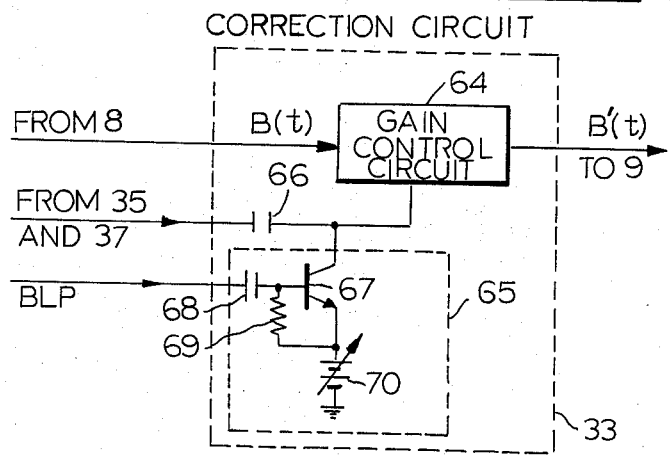
FIG. 19 is a circuit diagram showing a practical example of a correction circuit in FIG. 16, which works as a gain control circuit.

The color error components are also suppressed by decreasing the gain thereof according to the correction signal derived from the difference signal. The construction used for this purpose is almost the same as that of FIG. 14 or FIG. 16, except that the gain control circuits are used as the correction circuits 30 and 31, or 32 and 33 in place of the adding circuits. The correction signals can be as shown in FIG. 15b for the condition $m_R \cdot R = m_B \cdot B$, or as shown in FIG. 17c and FIG. 17 for the condition $m_R \cdot R = n \cdot m_B \cdot B$. FIG. 19 shows one of the examples of such a correction circuit which consists of a gain control circuit 64 and a clamping circuit 65. In this circuit, the gain of the color component signal such as the blue component signal which includes the color error components therein and is supplied to the input terminal of the gain control circuit 64 is controlled by the correction signal which is produced from the difference signal in the same way as the embodiment of FIG. 14 or FIG. 16 and supplied to the control terminal of the gain control circuit 64 through a capacitor 66. The zero level of the correction signal should be clamped at the reference voltage by the clamping circuit 65 which is constituted by a switching transistor 67 to the base electrode of which the horizontal blanking pulse is supplied through a capacitor 68, a resistance 69 and a DC voltage source 70, so that the reference level of the correction signal will not change irrespective of its wave shape. Since the gain of the color component signals such as shown in FIG. 5b and FIG. 5c or FIG. 8b and FIG. 8c either increase or decrease according to the amplitude and polarity of the correction signal, the color error components are suppressed in the corrected color component signals.

It is obviously possible to suppress the color error components in the color difference signals which are reproduced from the luminance signal $Y_L(t)$ and color component signals and which include the color error components therein. In this case, those reproduced signals provided directly to the encoder are processed with each other to produce the color difference signals such as an R-Y signal and a B-Y signal in the same way as the prior art. Then the color error components in the color difference signals are similarly suppressed according to the color correction signals.

Figure 20:
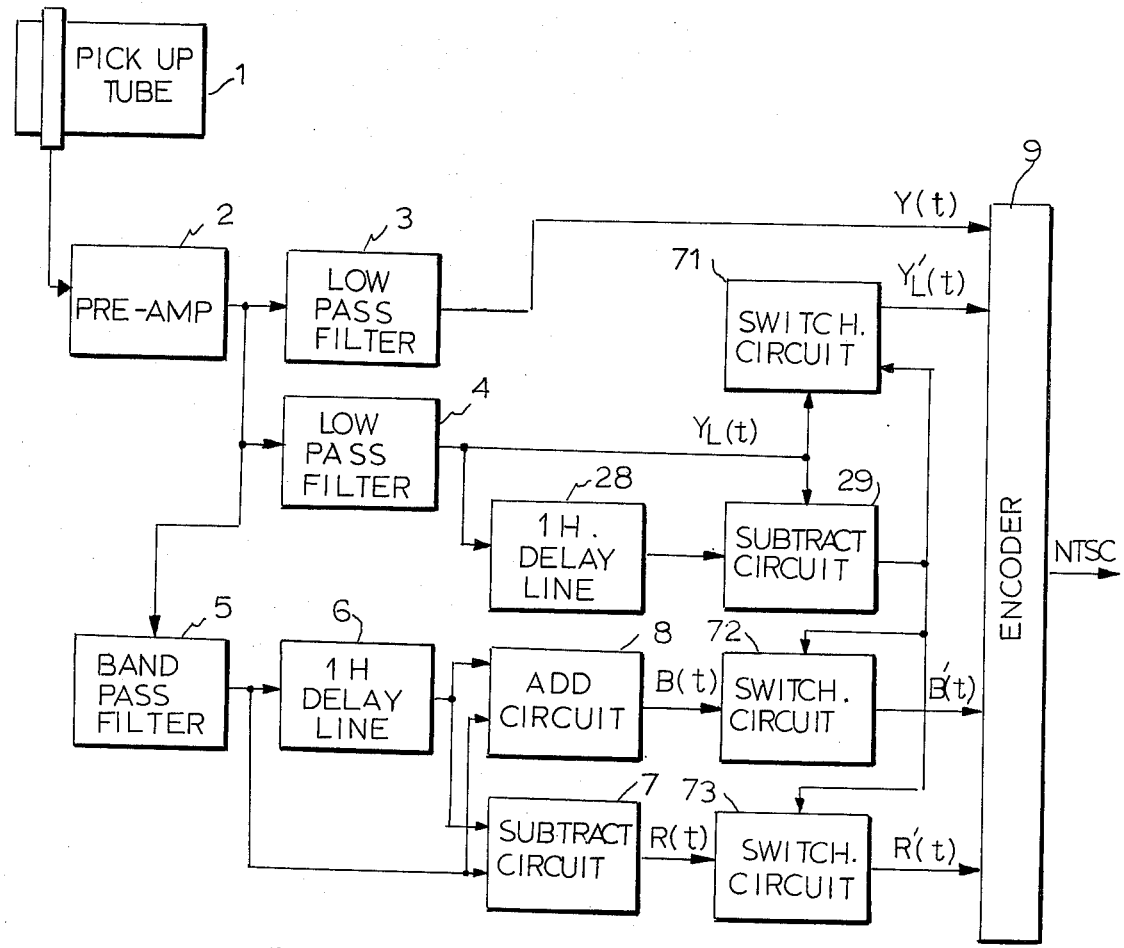
FIG. 20 is a block diagram showing the constitution of a fourth embodiment of the color suppression apparatus according to this invention.

The color errors may be cancelled by removing the luminance signal $Y_L(t)$ and the reproduced color component signals when a color error occurs. The embodiment shown in FIG. 20 is for carrying out this method. In FIG. 20, the numerals 1~9, 28 and 29 designate the same elements as FIG. 14, and the additional elements 71~73 are switching circuits which turn off in response to the difference signal from the subtractive circuit 29. When the video pattern which has relationships in the successive scan lines such as a vertical color bar pattern is scanned, no color error components are generated in the operating circuits 7 and 8, and the difference signal does appear in the substractive circuit 29. But if it has no relationship even partially similar to a horizontal color bar pattern, color error components are generated and also a difference signal is produced. The difference signal is provided supplied to switching circuit 71 connected between the low-pass filter 4 and the encoder 9, to switching circuit 72 connected between the addition circuit 8 and the encoder 9, and to switching circuits 73 connected between the substractive circuit 7 and the encoder, so as to switch them off when the color error occurs. As a result the color signal is removed at such edge portions and only the luminance signal exist. The removal of the color signal is no problem because the sensitivity of human eyes to edge portions is reduced, especially between colors.

Figure 21:
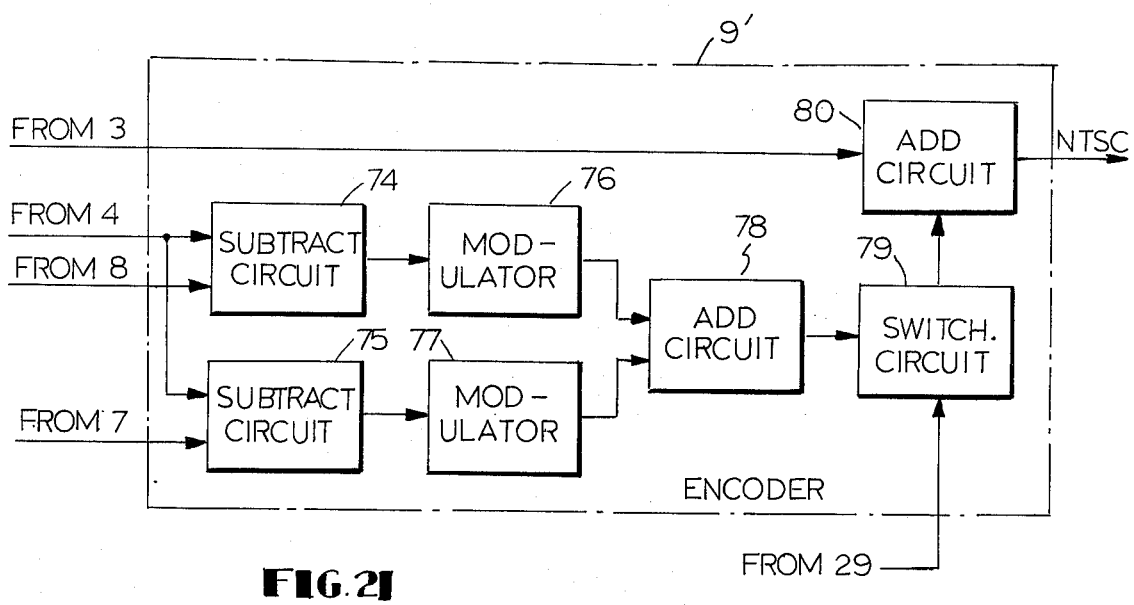
FIG. 21 is a block diagram showing the principal constitution of a fifth embodiment according to this invention.

FIG. 21 shows another example making use of this method, where the removal of color error components can be achieved by only one switching circuit in the encoder 9'. In FIG. 21 all signals $Y(t)$, $Y_4(t)$, $B(t)$ and $R(t)$ are supplied directly to the encoder in the same way as in the prior art arrangement shown in FIG. 1, and the difference signal from the and subtracting circuit such as 29 is also supplied thereto. The color difference signal $B-Y_L$ and $R-Y_L$ are produced in substracting circuit 74 and 75 in the encoder 9' from the color component signals $B(t)$, $R(t)$ and the luminance signal $Y_L(t)$, then modulated in balanced modulators 76 and 77, respectively. They are mixed in an adding circuit 78 and supplied a switching circuit 79 which turns off in response to the difference signal such as shown in FIG. b. The modulated color difference signals from which error components are have been removed are then combined with the luminance signal in an adding circuit 80 to generate the NTSC signal.

In the aforecited embodiments, the difference signal is derived from the luminance signal $Y_L(t)$ the bandwidth of which is limited by the low-pass filter 4 so as to be substantially equal to that of the reproduced color signals. But it is also possible to produce it from the unmodulated signal or the luminance signal $Y(t)$ through another low-pass filter such that the lag time thereof is shorter than the low-pass filter 4.

The method and apparatus of this invention for suppressing color errors are applicable not only to a television camera in which the color components are spatially modulated at the same frequency, but to one in which they are modulated at different frequencies, so along as the interrelation of the signals in the successive scan lines is utilized for reproducing the color component signals. For instance, the reproduction of the color component signals with the suppressed error components on/or the condition that the modulating frequency for red is 3.8 MHz and that for blue is 4.5 MHz is possible by the same block diagram circuit as shown in FIG. 14 or others.

Although this invention has been particularly shown and described, it is contemplated that various changes and modifications may be made without departing in any way from the scope of this invention as set forth in the following claims. The embodiments of the invention in which an exclusive property or privilege is claimed are defined as follows:

What we claim is:

1. A color error suppression apparatus for a color television camera in which at least a first and second color are spatially modulated in a pick-up tube by color filter means, so that at least one of the modulated signals representing the first and second colors has a phase which is different from the phase of the same color in adjacent scan lines and color signals are produced by utilizing the difference in phases in successive scan lins, said apparatus comprising:

color correction signal generating means including a filter circuit means responsive to an output from said pickup tube for generating a luminance signal representing the luminance of the color signal, a delay circuit means coupled to said filter circuit means for delaying said luminance signal and a correction circuit means coupled to said filter circuit means and said delay circuit means for operatively combining said luminance signal and the output of said delay circuit means for generating a color correction signal;

color component recovery circuit means responsive to the modulated component of the output from said pick-up tube for operating upon such component to recover color component signals which represent at least the first and second colors of the color image and include color error components generated in this circuit means; and signal combining circuit means coupled to said color correction signal generating means, and said color component recovering circuit means and responsive at least to said color correction signal and color component signals for combining said signals to generate color signals representing colors of the color image, such that the color error components included in the color signals are suppressed.

2. A color error suppression apparatus as claimed in claim 1 further comprising further circuit means responsive to an unmodulated component of the output from said pick-up tube for generating a luminance signal representing a luminance of the color image, said signal combining cirucit means being coupled to said further circuit means and responsive to said color correction signal, color component signals and said luminance signal from said further circuit means for combining said signals to generate color signals.

3. A color error suppression apparatus as claimed in claim 1 wherein:

said delay circuit means comprises a delay circuit coupled to said filter circuit means for delaying the signal therefrom by one horizontal scanning period;

and said correction circuit means comprises:

a subtracting circuit coupled to said filter circuit means and said delay circuit means and responsive to said luminance signal from said filter circuit means and an output signal from said delay circuit means for subtracting these signals from each other;

a control circuit coupled to said subtracting circuit and said filter circuit means for adjusting the wave shape of the signal from said filter circuit means in accordance with an output from said subtracting circuit for producing a corrected luminance signal; and said signal combining circuit means comprises operating circuit means coupled to said control circuit for combining said corrected luminance signal and said color component signals so that the color error components are suppressed and color signals which are required to generate a color video signal are produced.

4. A color error suppression apparatus as claimed in claim 1 wherein said signal combining circuit means comprises:

control circuit means responsive to both color component signals and said color correction signal for adjusting the wave shapes of said color component signals in accordance with said color correction signal for producing corrected color component signals; and operating circuit means coupled to said control circuit means for combining said corrected color component signals and said luminance signal for producing color signals which are required to generate a color video signal and the color error components included in the color signals are suppressed.

5. A color error suppression apparatus as claimed in claim 1 wherein said signal combining circuit means comprises:

control circuit means responsive to said luminance signal and said color component signals including color error components for conbining said signals to produce color signals which are required to generate a color video signal; and operating circuit means coupled to said control circuit means and responsive to said color signals and said color correction signal for adjusting the wave shapes of said color signals in response to said color correction signal for at least decreasing the color error components in said color signals.

6. A color error suppression apparatus as claimed in claim 1 wherein said color correction signal generating means comprises luminance signal generating means for generating a luminance signal from the output of said pick-up tube, and delay circuit means coupled to said luminance signal generating means for delaying said luminance signal by one horizontal scanning period;

adding circuit means coupled to said delay circuit means and said luminance signal generating means for adding the output signal of said delay circuit means and the luminance signal constituting the input thereto for producing a corrected luminance signal.

7. A color error suppression apparatus for a color television camera in which at least first and second colors are spatially modulated in a pick-up tube by color filter means so that at least one of the modulated signals has a phase which is different from the phase of the same color in adjacent scan lines and color signals are produced by utilizing the difference in phases in successive scan lines, said apparatus comprising:

first filter circuit means responsive to an unmodulated component of an output from said pick-up tube for producing a signal representing the luminance of the color image;

first delay circuit means responsive to said luminance signal from said filter circuit means for delaying such input signal by one horizontal scanning period;

color correction signal generating circuit means coupled to said first delay circuit means and responsive to both the luminance signal from said first filter circuit means and an output signal of said first delay circuit means for combining said signals to generate a color correction signal;

second filter circuit means responsive to an unmodulated component of the output from said pick-up tube for producing a luminance signal representing the luminance of the color image;

third filter circuit means responsive to the output from said pick-up tube for deriving a modulated component thereof;

second delay circuit means coupled to said third filter circuit means for delaying an output of said third filter circuit means by one horizontal scanning period;

color component recovering circuit means coupled to said third filter circuit means and said second delay circuit means and responsive to both outputs of said third filter circuit means and said second delay circuit means for combining said outputs to recover color component signals representing at least the first and second colors of the color image and including color error components generated in this circuit means; and signal combining circuit means coupled to said second filter circuit means, and color correction signal generating circuit means and said color component recovering circuit means and responsive to said luminance signal, said color correction signal and said color component signals for combining said signals to generate color signals representing colors of the color image, the color error components of which color signals are suppressed in accordance with said color correction signal.

8. A color error suppression apparatus as claimed in claim 7 wherein said signal combining circuit means comprises:

control circuit means responsive to both said luminance signal and said color correction signal for adjusting the wave shape of said luminance signal in accordance with said color correction signal for producing a corrected luminance signal; and operating circuit means coupled to said control circuit means for operating upon said corrected luminance signal and said color component signals for producing color signals which are required to generate a color video signal and the color error components included in said color signals are suppressed.

9. A color error suppression apparatus as claimed in claim 8 wherein said control circuit means comprises:

a subtracting circuit coupled to said first filter circuit means and said first delay circuit means and responsive to the signal from said first filter circuit means and an output signal from said first delay circuit means for subtracting these signals to generate a difference signal;

a weighting circuit coupled to said subtracting circuit and responsive to the difference signal therefrom for controlling the amplitude of the difference signal in response to the polarity thereof; and an adding circuit coupled to said weighting circuit and said first filter circuit means for adding an output from said weighting circuit and the signal from said first filter circuit means to generate a corrected luminance signal.

10. A color error suppression apparatus as claimed in claim 8 wherein said control circuit means comprises:

a subtracting circuit means coupled to said first filter circuit means and said first delay circuit means and responsive to the signal from said first filter circuit means and an output from said first delay circuit means;

an adding circuit coupled to said subtracting circuit and said first filter circuit means for adding an output from said subtracting circuit and the signal from said first filter circuit means for producing a corrected luminance signal.

11. A color error suppression apparatus as claimed in claim 7 wherein said signal combining circuit means comprises:

control circuit means coupled to said color correction signal generating circuit means and said color component recovering circuit means and responsive to said color correction signal and said color component signals for combining said signals to produce corrected color component signals, the wave shape of which is controlled in response to said color correction signal; and processing circuit means coupled to said second filter circuit means and said control circuit means and responsive to said luminance signal and said corrected color component signals for generating color signals.

12. A color error suppression apparatus as claimed in claim 11 wherein said color correction signal generating circuit means and said control circuit means comprises:

a subtracting circuit responsive to both said signal from said first filter circuit means and the output of said first delay circuit means for subtracting said signals from one another for generating a difference signal;

a first color correction signal generating circuit coupled to said subtracting circuit and responsive to said difference signal for generating a first color correction signal;

a second color correction signal generating circuit coupled to said subtracting circuit and responsive to said difference signal for generating a second color correction signal;

a first correction circuit coupled to said first color correction signal generating circuit and to said color component recovering circuit means and resposive to said first color correction signal and the first color component signal representing the first color for producing a corrected first color component signal; and a second correction circuit coupled to said second color correction signal generating circuit and to said color component recovering circuit means and responsive to said second color correction signals and the second color component signal for producing a corrected second color component signal.

13. A color error suppression apparatus as claimed in claim 12 wherein at least one of said first color correction signal generating circuit and second color correction signal generating circuit comprises:
   a first controlled signal producing circuit coupled to said subtracting circuit and responsive to a positive component of said difference signal for producing a first controlled signal;
   a second controlled signal producing circuit coupled to said subtracting circuit and responsive to a negative component of said difference signal for producing a second controlled signal;
   a controlled signal combining circuit coupled to both said controlled signal producing circuits and responsive to said first and second controlled signals for combining said signals for producing at least one of the first and second color correction signals.

14. A color suppression apparatus as claimed in claim 12 wherein at least one of said first color correction signal generating circuit and second color correction signal generating circuit comprises:
   a first controlled signal producing circuit coupled to said subtracting circuit and responsive to one of the positive and negative components of said difference signal for producing a first controlled signal;
   a controlled signal and difference signal combining circuit coupled to said subtracting circuit and said first controlled signal producing circuit and responsive to both said difference signal and said first controlled signal for combining said signals for producing at least one of the first and second color correction signals.

15. A color error suppression apparatus as claimed in claim 11 wherein said control circuit means is constituted by adding circuits for adding said color component signals and said correction signals.

16. A color error suppression apparatus as claimed in claim 9 wherein said signal combining circuit means comprises:
   gain control circuit means responsive at least to one of said luminance signal and said color component signals for controlling the gain thereof in response to said color correction signal; and
   operating circuit means to which said gain control circuit means is coupled and responsive to said luminance signal and said color component signals, the gain of at least one of which is controlled by said gain control circuit means for combining said signals to generate the color signals.

17. A color error suppression apparatus as claimed in claim 7 wherein said signal combining circuit means comprises:
   removing circuit means for receiving said luminance signal and said color component signals including color error components and for removing such signals in response to said color correction signals; and
   processing circuit means coupled to said removing circuit means and responsive to the output from said removing circuit means to produce a color video signal in which said color error components are absent.

18. A color error suppression apparatus as claimed in claim 7 wherein said signal combining circuit means comprises:
   a first color difference signal producing circuit responsive to said luminance signal and one of said color component signals which represents the first color and includes color error components for producing a first color difference signal;
   a second color difference signal producing circuit responsive to said luminance signal and the other color component signal which represents the second color and includes color error components for producing a second color difference signal;
   a first modulating circuit coupled to said first color difference signal producing circuit for modulating said first color difference signal;
   a second modulating circuit coupled to said second color difference signal producing circuit for modulating said second color difference signal;
   a first mixing circuit coupled to both said first and second modulating circuit for mixing the outputs therefrom;
   a removing circuit coupled to said mixing circuit and said color component recovering circuit means for removing the color error components in the output of said mixing circuit in accordance with said color correction signal; and
   a second mixing circuit coupled to said removing circuit and responsive to both the output of said removing circuit and the luminance signal which is derived from the output from said pick-up tube for producing a color video signal in which the color error components are suppressed.

19. A color error suppression apparatus as claimed in claim 7 wherein said signal combining circuit means comprises:
   a first color difference signal producing circuit responsive to said luminance signal and one of the color component signals which represents the first color and includes color error components for producing a first color difference signal;
   a second color difference signal producing circuit responsive to said luminance signal and the other color component signal which represents the second color and includes color error components for producing a second color difference signal;
   a first wave shape adjusting circuit coupled to said first color difference signal producing circuit and said color component recovering circuit means for adjusting the wave shape of said first color difference signal in accordance with said color correction signal;
   a second wave shape adjusting circuit coupled to said second color difference signal producing circuit and said color component recovering circuit means for adjusting the wave shape of said second color difference signal in accordance with said color correction signal; and
   a shaped wave combining circuit coupled to said wave shape adjusting circuits for receiving the outputs from said wave shape adjusting circuits and the luminance signal for producing a color video signal in which the color error components are suppressed.

20. A method of suppressing color error components generated in a color television camera in which at least a first and second color are spatially modulated in a pick up tube by color filter means so that at least one of the modulated signals representing the first and second color have different phase relationships in the successive scan lines, and color signals are reproduced by utilizing said difference of the phase relationships, said method comprising the steps of:

deriving a signal representing the luminance of the color image from an unmodulated component of the output from said pick up tube;

generating a color correction signal by operating upon said derived signal;

deriving a luminance signal representing the luminance of the color image from an unmodulated component of the output from said pick up tube;

recovering color component signals representing at least first and second colors by operating upon the modulated component of the output from said pick-up tube;

adjusting the wave form of at least one of said luminance signal and color component signals in accordance with said color correction signal; and producing color signals required to generate a color video signal by combining said luminance signal and said color component signals, whereby the color error components in said color signals are suppressed.

21. A method of suppressing color error components as claimed in claim 20 wherein only the wave shape of said luminance signal is adjusted in accordance with said color correction signal, and the color error suppression is achieved by combining said adjusted luminance signal with each color component signal.

22. A method of suppressing color error components as claimed in claim 20 wherein the wave shapes of said color component signals are adjusted in accordance with said color correction signal to suppress the color error components.

23. A method of suppressing color error components generated in a color television camera in which at least a first and second color are spatially modulated in a pick up tube by color filter means so that at least one of the modulated signal representing the first and second colors has different phase relationships in the successive scan lines and color signals are produced by utilizing said difference of the phase relationships, said method comprising the steps of:

producing a signal representing the luminance of the color image from an unmodulated component of the output from said pick-up tube;

delaying said produced signal by one horizontal scanning period;

combining said produced signal and delay signal to generate a difference signal which indicates the positions of color errors;

generating a first and second color correction signal from said difference signal;

delaying the modulated component of the output from said pick-up tube by one horizontal scanning period;

combining said modulated component and delayed modulated component to recover at least first and second color signals representing the first and second colors, respectively, which color signals include color error components generated during said operation on said modulated component;

suppressing the color error components in the first color signal in response to said first color correction signal; and suppressing the color error components in the second color signal in response to said second color correction signal.

* * * * *